May 10, 1960 J. J. PHILLIPS, JR 2,935,908
APPARATUS FOR CHROMATOGRAPHIC ANALYSIS
Filed Aug. 16, 1956 5 Sheets-Sheet 1

Inventor:
John J. Phillips Jr
by Thomas H. Hamilton
Attorney

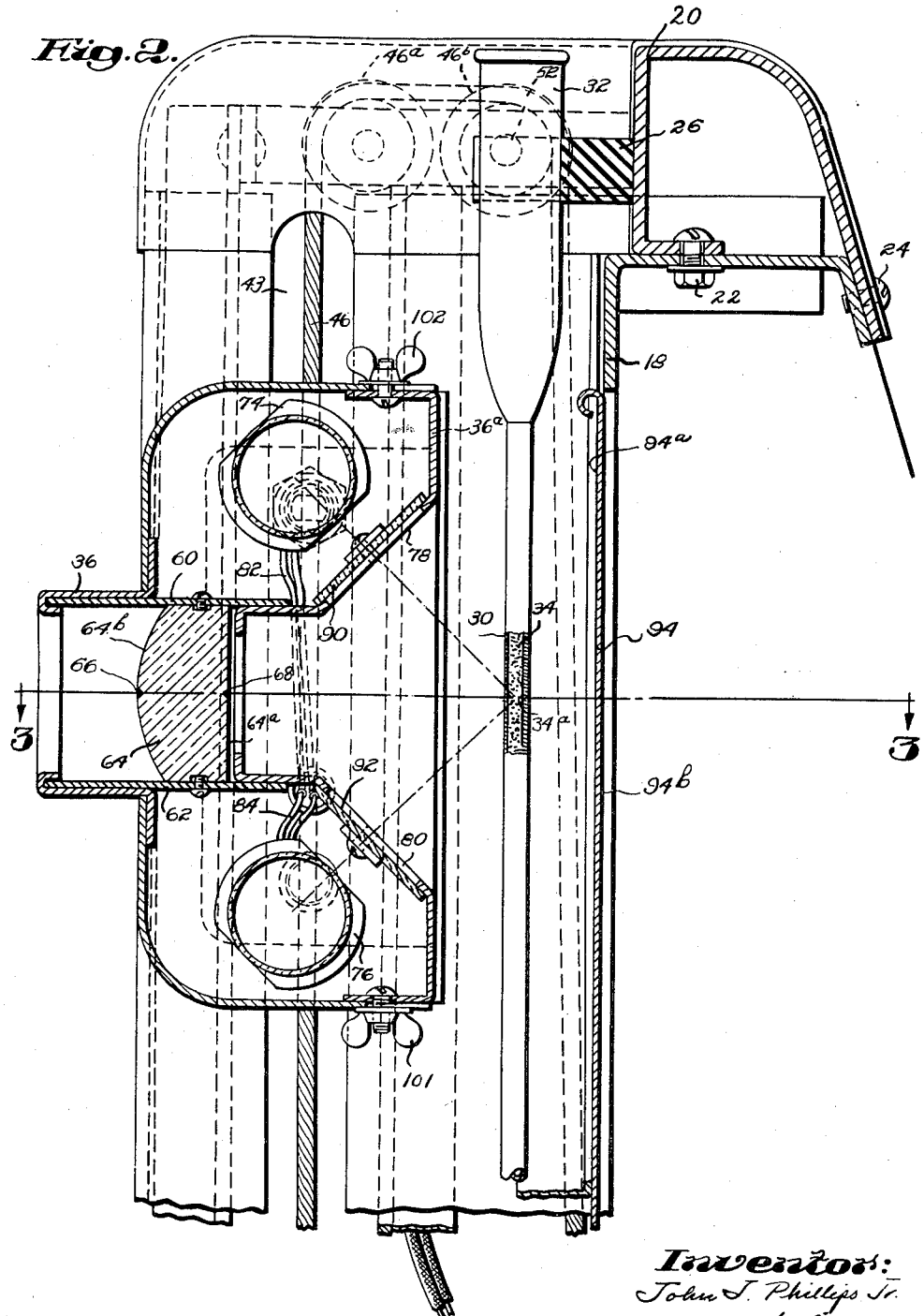

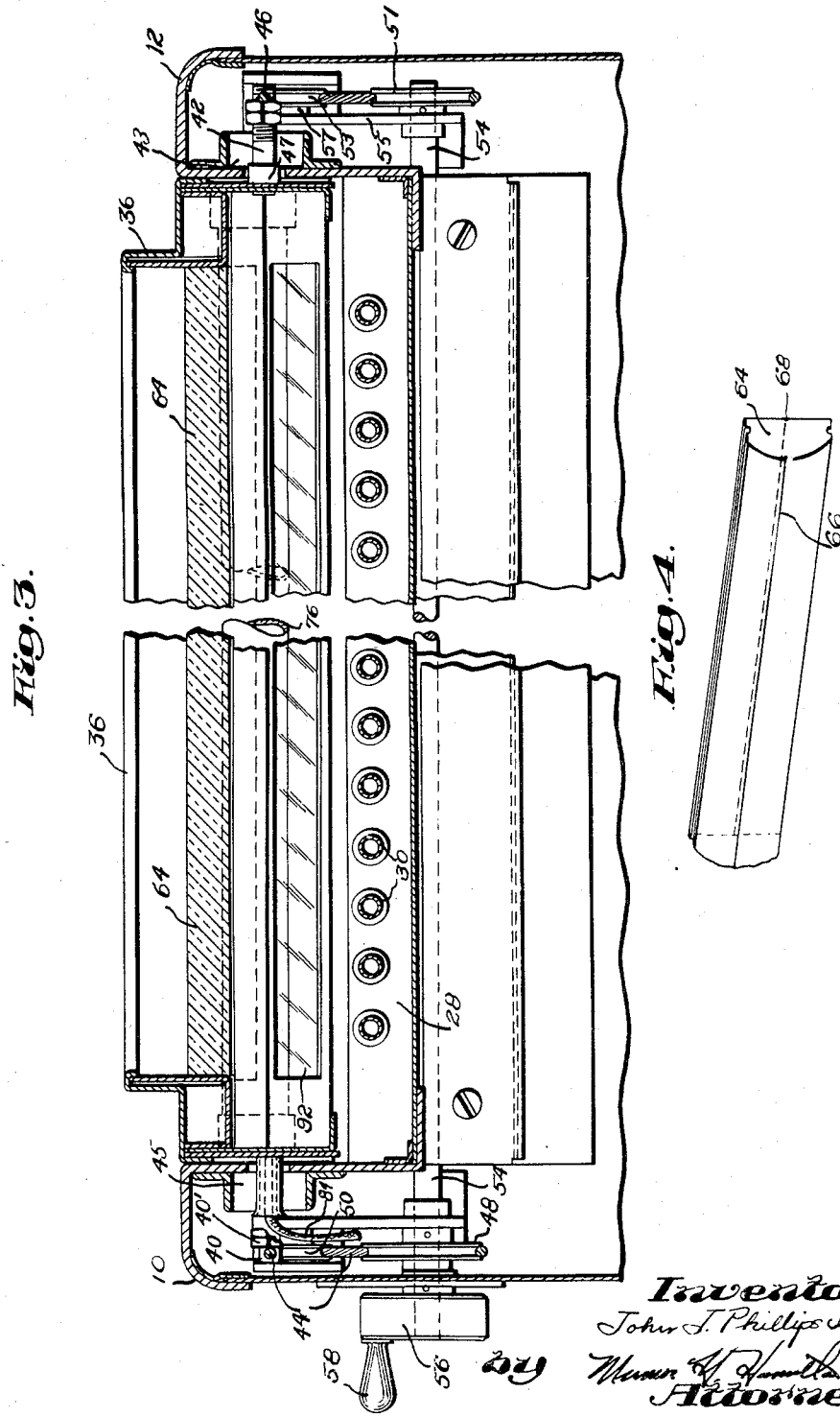

May 10, 1960         J. J. PHILLIPS, JR         2,935,908
APPARATUS FOR CHROMATOGRAPHIC ANALYSIS
Filed Aug. 16, 1956                              5 Sheets-Sheet 4
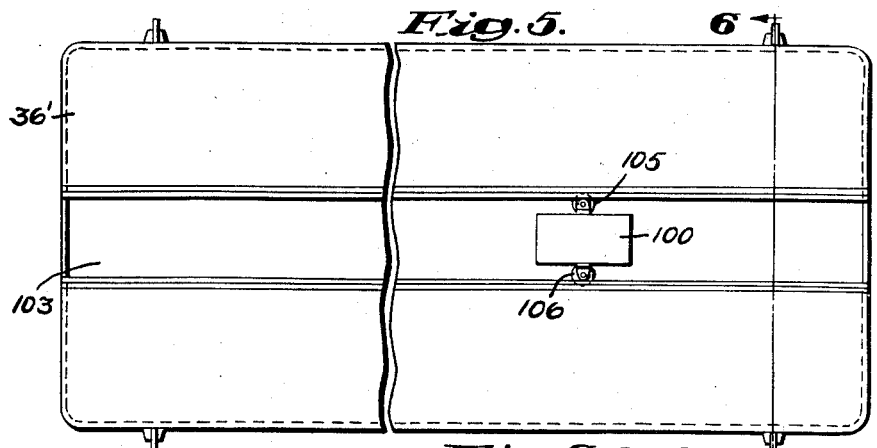
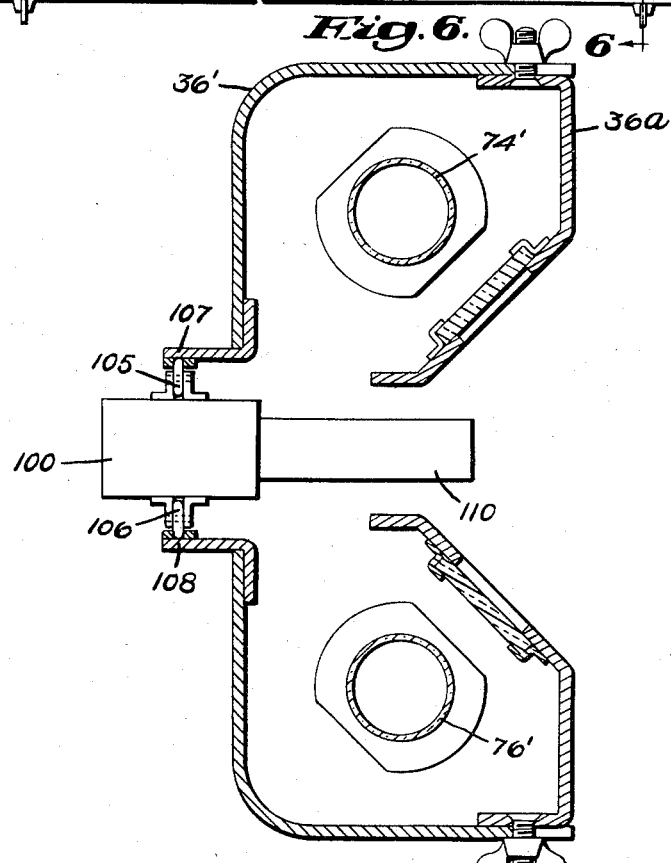

May 10, 1960  J. J. PHILLIPS, JR  2,935,908
APPARATUS FOR CHROMATOGRAPHIC ANALYSIS
Filed Aug. 16, 1956  5 Sheets-Sheet 5
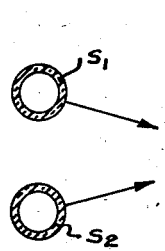
FIG. 7
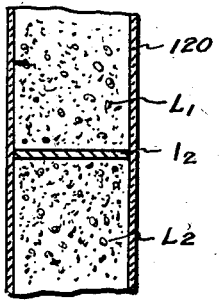
FIG. 8
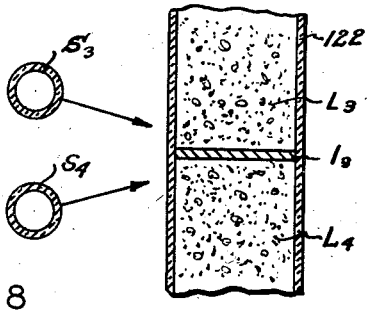
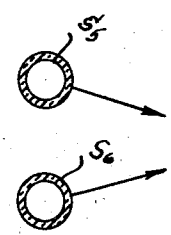
FIG. 9
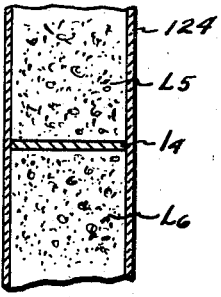
FIG. 10
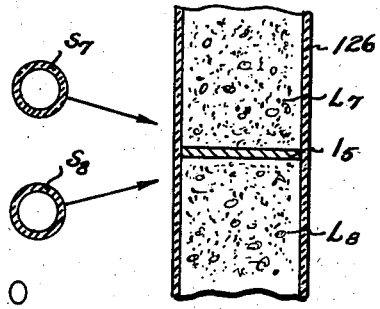
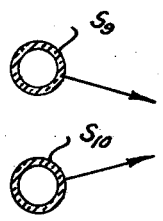
FIG. 11
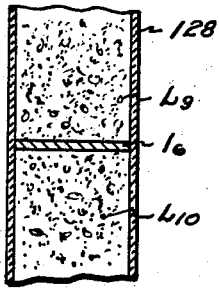
FIG. 12
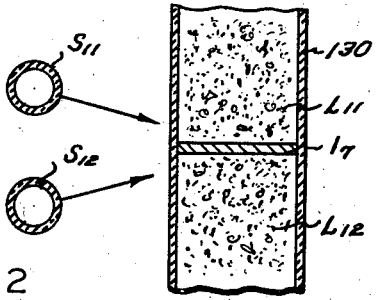
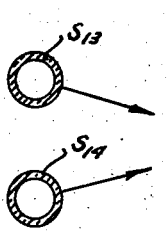
FIG. 13
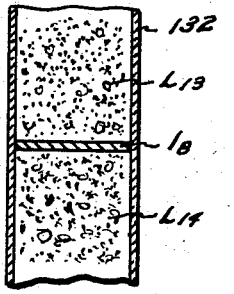
FIG. 14
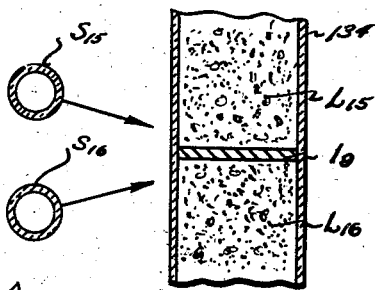
INVENTOR.
John J. Phillips Jr.
BY
ATTORNEY United States Patent Office 2,935,908
Patented May 10, 1960

2,935,908

APPARATUS FOR CHROMATOGRAPHIC ANALYSIS

John J. Phillips, Jr., Weston, Mass., assignor to Phillips Scientific Corporation, Brighton, Mass., a corporation of Massachusetts Application August 16, 1956, Serial No. 604,513

4 Claims. (Cl. 88—14)

This invention relates to an improved method and apparatus for chromatographic analyses of fluid bodies wherein a mass of chemically adsorptive material is supported in a transparent conduit so that a confined flow of a given fluid body through the chemically adsorptive material may be caused to take place to form one or more selective adsorption layers. The layers thus produced may be examined visually or with radiation sensing instruments to furnish desirable quantitative and qualitative determinations with respect to the chemical composition and other characteristics of the fluid body analyzed.

The meeting of two differently colored adsorption layers as employed in chromatography necsesarily occurs along a plane of junction which represents a merging together of two colors to form a very narrow boundary region which is of a transient nature and which appears to the eye when irradiated as a different color than either of the two component colors or, in the case of there being a single color only in one adsorption layer, there is a boundary region representing the termination of one color. The boundary region of this transient nature is conveniently referred to as an interface and, since the interface may change its location to denote desired values of chromatographic analysis, the boundary region is hereinafter referred to in the specification as the "indexing interface."

Similarly, boundary regions exist between zones or layers which do not exhibit either visible or fluorescent colors, but absorb or generate invisible wavelengths of electromagnetic radiation. The differences in properties of two such layers in close juxtaposition can be detected with suitable instruments. Since the problem of the boundary layer is essentially the same whether visible or invisible radiation is involved, I will confine my description of the invention to the case where visible colors are present.

In carrying out readings by means of an indexing interface in chromatographic analysis work, there are two immediate considerations, one of which is accuracy of reading the position of the indexing interface in reference to a scale; and the other of which is speed in making a single reading and, in many cases, a series of readings in rapid succession. Considerable difficulty has been experienced in the art in realizing both accuracy and speed in dealing with an interface which is of transient nature and also affected by other factors. One source of difficulty resides in the fact that the thickness dimension of the indexing interface tends to vary frequency and cannot be maintained as sharply defined as should be the case in order to provide workable accuracy. It is found that the indexing interface tends to become fuzzy and indistinct for a number of reasons. It will be appreciated that the interface, to be viewed properly, requires that light be reflected from two different adsorptive bodies, at least one of which is colored.

A problem arises here in that, to achieve an accurate reading, there must be a sufficient amount of illumination to provide clarity and yet, if there is any appreciable excess of radiation or if the radiation is not properly directed or if there is loss of light intensity balance, then light dispersion and light diffusion effects may, to a greater or lesser degree, operate to either increase the thickness of an indexing interface or render it very indistinct so that there is loss of definition and an appreciable error in reading may occur. It is also to be noted that, if the indexing interface is viewed from an observation point which lies above or below the plane of an indexing interface at any given time, the thickness of the interface will appear as being of a greater thickness than it actually is and a source of error arises here also.

In one specific instance, for example, if an excess of illumination is employed, the thickness of an indexing interface may be enlarged by reason of light dispersion and diffusion effects wherein a source light component tends to be transmitted through the color region of one adsorption layer into and through the interface and then into the color region of the second adsorption layer. A loss of definition in the interface or displacement of color boundary then tends to take place. Displacement or loss of definition may occur, I find, where, for example, a single light source is located above or below the eye level from which the indexing interface is being viewed. This situation is further complicated by the fact that two different color bodies combining or merging to make up an indexing interface may require respectively different intensities of light in order to be illuminated sufficiently to establish sharp definition.

It is an object of the invention to overcome these problems; to improve methods and apparatus for controlling the irradiation of adsorbed layers and carrying out chromatographic analyses of fluids. It is also an object to devise an apparatus which provides for highly accurate visual inspection of selective adsorption layers and which can be very conveniently and efficiently operated, to permit a series of observations to be made in rapid succession. Another object of the invention is to combine with an apparatus of the character referred to means for selectively illuminating the adsorption layers with variable light intensities. A further object is to provide an apparatus for utilizing various types of radiations and controlling the manner in which these radiations are employed in relation to color values of adsorbent layers. Still another object is to induce in adsorption layers specific fluorescence effects caused by different wavelengths, and to devise radiation sensitive detecting and measuring means which may be used in conjunction with a chromatographic apparatus for various types of radiations. Still another object is to devise a combination radiation viewing and measuring device which includes a novel filtering means, as well as means for absorbing and reflecting radiations.

These and other objects and novel features will be more fully understood and appreciated from the following description of a preferred embodiment of the invention selected for purposes of illustration and shown in the accompanying drawings, in which:

Fig. 2 is a vertical, cross-sectional view taken through the sighting slide mechanism;

Fig. 3 is a cross-sectional view taken on the line 3—3 of Fig. 2;

Fig. 4 is a detailed perspective view showing the optical magnifying and sighting element employed in the sighting slide of the invention;

Fig. 5 is a front elevational view of the modified slide structure adapted to be used with the apparatus of the invention;

Fig. 6 is a vertical, cross-sectional view of the structure shown in Fig. 5;

Fig. 7 is an enlarged fragmentary view of a transparent analysis tube in which is indicated diagrammatically two adsorptine materials which have been treated with a fluid to be analyzed whereby the sample bodies appear as being of different colors which merge to define an indexing interface with ordinary light sources;

Fig. 8 is a fragmentary elevational view of an analysis tube indicating diagrammatically adsorption layers and an indexing interface and further illustrating a pair of light source members of predetermined intensity;

Fig. 9 is another fragmentary view similar to Fig. 8 showing adsorption layers, interface and a pair of light source members whose intensities differ in accordance with the selective characteristics of the adsorption layers in the sample tube;

Fig. 10 is another fragmentary view in elevation of a sample tube having adsorption layers and an interface and further showing light source members for emitting ultra-violet light to irradiate adsorption layers of the fluorescent type;

Fig. 11 is another fragmentary elevational view of a sample tube illustrating the use of ultra-violet light type source members in combination with adsorption layers which absorb ultra-violet light;

Fig. 12 is a fragmentary elevational view of a sample tube illustrating a pair of sources for emitting infrared radiation used in conjunction with adsorption layers which absorb such radiations;

Fig. 13 is a fragmentary elevational view of a sample tube combined with sources for emitting radio waves and adsorption layers which will absorb the radio waves; and Fig. 14 is another fragmentary elevational view of a sample tube showing a pair of devices which emanate radiations.

Figure 1:
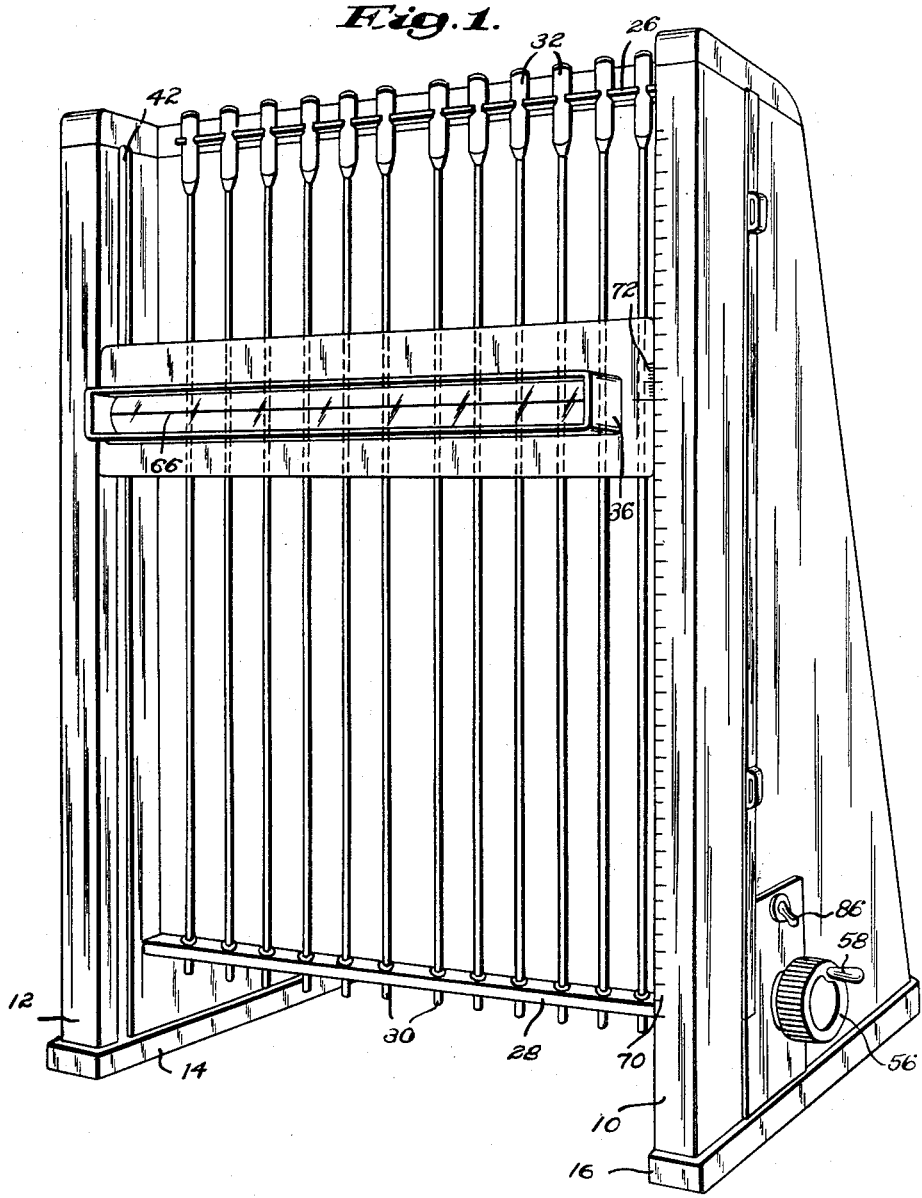
Fig. 1 is a view showing the chromatographic apparatus of the invention as viewed from its front side.

In one preferred embodiment, the invention deals with taking a plurailty of readings which, it should be understood, must be done very quickly because the zones which produce the indexing interfaces are continually moving. Thus, if four readings are made in sequence within five seconds along the length of a chromatographic tube, there might be an error of about one millimeter in over-all sample length, assuming the zones were travelling 72 centimeters per hour. This might represent an error of 0.2% if the sample took up a length of 50 centimeters. The corresponding error, if 50 seconds were required to make the same measurement, would be 2.0%.

The invention is based on a novel concept of irradiating chromatographic layers wherein the irradiation source is controlled and regulated in accordance with the radiation transmitting and spectral characteristics of respective adsorption layers. In carrying this novel concept of irradiating into effect, I have devised a method of making a chromatographic determination which consists essentially in producing two differently colored adsorbent layers separated by a transient indexing interface, then irradiating the two layers from enclosed radiation sources which are located in spaced relation to the adsorbent layers at points above and below the said indexing interface and which radiation sources are controlled and regulated in intensity and in other respects, in accordance with the radiation transmitting and spectral characteristics of each of the layers whereby the indexing interface appears in a clearly visible state and yet is maintained substantially at that minimum thickness which provides for optimum definition of interface without apparent boundary displacement or distortion, and viewing the indexing interface along a horizontal sighting plane passing between the irradiation sources and through the said indexing interface and from a point occurring externally of said light sources.

I have discovered that, in regulating irradiation, it may become important to control several factors including the number of sources of radiation which are employed, the location of the sources in relation to the adsorptive layers and their indexing interface, the angle of incidence of objective beams of light travelling from the source, and the intensity of the beams with respect to each of the adsorption layers and the interface.

In carrying out such a method of chromatographic analysis, I have further devised a specially constructed viewing apparatus in which two radiation sources may be located above and below the level of the plane of observation of an indexing interface. I further find that I may vary and adjust the intensity and character of the respective radiation sources in this viewing apparatus in accordance with the radiation transmitting and spectral characteristics of the adsorption layers and I may provide light filtering means as well as instrumentalities for controlling reflected light and for absorbing some of the light rays from the radiation sources.

In controlling irradiation of adsorptive layers in accordance with the method of the invention, I may also employ a number of different forms of viewing apparatus in which may be included means for furnishing radiation and combining it with regulating and positioning devices. Thus, in Figs. 1–4, inclusive, there is illustrated in some detail one preferred form of viewing apparatus which is intended to be employed in any one of a number of different techniques of the invention. Figs. 5 and 6 are illustrative of specific forms of radiation sensing devices. Figs. 7–14, inclusive, are intended to be illustrative of specific steps of controlling or regulating radiations and the intensity and spectral characteristics of such radiations in accordance with radiation transmitting properties or radiation absorbing properties of chromatographic layers.

Considering first the structure shown in Figs. 1–4, inclusive, this apparatus will be described having in mind, in general, the use of two radiation sources of balanced intensity selected for optimum illumination of adsorption layers with a minimum of diffusion or dispersion effects being produced.

In the structure shown in Figs. 1–4, inclusive, the numerals 10 and 12 denote a pair of upper sides which are supported on base elements 14 and 16 and connected to one another by means of a rear wall section 18 and a top 20 detachably secured to the rear wall section, for example by fastenings, as 22 and 24. These structural members are preferably shaped in the manner indicated and, when secured together, comprise a relatively rigid upright frame which can easily be taken apart and assembled at will.

Transversely disposed between the sides of the frame are located upper and lower rack elements 26 and 28 which are formed with holes vertically disposed therethrough. The racks may conveniently be formed of rubber, rubber-like materials, or other suitable substances. Removably supported in the racks 26 and 28 are container members which may conveniently consist of a plurality of vertically disposed tubes 30 composed of a transparent material, such as glass. The tubes are open at their upper and lowre ends and are preferably formed with enlarged top sections 32, as shown in Fig. 1. Received in these tubes are masses or columns of a chemically adsorbent material 34 such as, for example, silica, carbon, and the like. The rack elements and tubes thus support the columns of adsorptive material in a position such that each column is in a substantially aligned position to an adjacent column extending across the enclosures defined by the sides 10 and 12 of the frame.

In carrying out chromatographic analyses of fluid materials in the apparatus described, a given fluid material to be analyzed is poured into one or more of the large tubular portions 32 and allowed to flow downwardly therethrough. The tubular members function to hold the fluid in closely confined relationship to the enclosed bodies of adsorptive material. In this way there is an opportunity for fluid to become adsorbed at some points within the tubes, thus producing the so-called "adsorption layers" L and L' which are separated by an indexing interface as shown in Fig. 2. Unadsorbed portions of the fluid eventually pass out of the lower ends of the tubular members and thereafter the adsorption layers of retained material, after having been visually inspected for information to be deduced from their presence may, in most instances, be dissolved or washed away with solvent materials. The tubes and their contents may then be used over again.

Associated with tubes is a special viewing device. The viewing device is preferably mounted for vertical movement between the sides 10 and 12 of the frame so that it may be used at any height of the tubes 30 and comprises an elongated slide member having a casing 36 which is open at its front and rear sides. At the ends of the slide are secured two supporting rod members 40 and 42 which extend into slots 43 and 45 formed in the sides 10 and 12, as is better shown in Figs. 2 and 3 of the drawings. The supporting rods are preferably formed with enlarged square sections, as 47, which function to guide the rods along restricted portions of their respective slots.

The rod members 40 and 42 are threaded at their outer extremities to receive thereon nuts 40' and 42' and transversely formed through the rods are holes through which are passed cable members 44 and 46 and are adapted to be held in fixed relation to the supporting rods where the nuts are turned into a position to engage against their respective cable portions. The cables are passed around upper and lower pairs of pulleys on opposite sides of the frame and an upper pair of pulleys have been indicated in dotted lines and denoted by reference numerals 46a and 46b. A lower pair of pulleys is denoted by numerals 48 and 50, as shown at the left-hand side of Fig. 3, and similarly numerals 51 and 53 indicate a second pair of pulleys at the right-hand side of Fig. 3. These pulleys are fixed on pulley shafts, as 52 and 54, and shaft 54 may be provided with a bracket 55 carrying a stub shaft 57 on which pulley 53 is supported. A similar arrangement may be provided for supporting the upper pairs of pulleys.

On the outer end of pulley shaft 54 at the bottom of the frame is provided an operating wheel 56 occurring externally of the frame and adapted to be turned by an operating handle 58. By means of the arrangement described the apparatus described may be moved up and down in the frame member into any desired position of alignment with adsorption layers occurring in the tubes 30. It will be apparent that as these latter members are all located in alignment across the frame, the sighting slide is spaced away from the tubular members a constant distance at all points therealong, so that the same relative reading position may be realized with respect to any one of the tubes.

Centrally disposed in the casing 36 of the slide member are top and bottom partitions 60 and 62, better shown in Fig. 2, which partitions support therebetween a translucent optical sighting and magnifying element 64 referred to as an anti-parallax member. This member is so arranged that when viewed from a point outside of the sighting slide it will afford a sight of tubular members 30 occurring in spaced relation to the inner surface of the slide. The element 64 has a vertical inner surface 64a and an outer convex surface 64b. On the inner surface 64a is formed an indicator line 68 and on the convex surface 64b is formed a second indicator line 66 which is located in a common horizontal plane extending throughout the length of the elements 64.

With the aid of these double indicator lines 66 and 68 it will be observed that an operator may quickly bring into alignment each of the two lines as well as a given point of level of an adsorption layer in one of tubes, and since both of the lines 66 and 68 lie in the same horizontal plane, a correct angle of viewing the adsorption layer is automatically provided. This affords a high degree of accuracy in taking a reading, and yet the anti-parallax device is quickly adjustable and useable in various positions which may be desired to be assumed from time to time.

To translate such a reading into a desired determination, I have further provided on the front surface of the side 10 of the frame a scale 70 and a cooperating vernier member 72 on the sighting slide casing 36. Movement of the vernier 72 into registered relationship with the markings on the scale 70 provides a reading which bears a definite relationship to the height on an observed adsorption zone in one of the tubes. In Fig. 2 I have indicated diagrammatically the chemically adsorbent material 34 in a condition in which two adsorption layers are present, which layers are separated by a miniscus line 34a lying in the same horizontal plane with the indicator lines 66 and 68 in register therewith, as suggested in Fig. 2.

For some purposes an anti-parallax device of this nature may be utilized employing as a source of illumination ordinary daylight, or some other given form of artificial light located at a considerable distance from the apparatus. In other cases, however, it has been found that the accuracy of analysis work demands a more precise type of radiation for properly revealing the presence of adsorption layers. In fact, some types of desirable radiation effects may be induced only by special application of selectively chosen light rays to the columns of adsorptive materials.

To satisfy conditions of the character indicated, I have devised special forms of radiation sources any of which may be preferably combined with the sighting slide so that the source may be moved with the optical magnifier in order that the lighting means will always be in the same relative position with respect to the magnifier and to the pair of indicator lines 66 and 68.

In one form of the radiation source of the invention, I have provided a pair of light sources for producing ordinary white light such as that of the fluorescent type and preferably consisting of tubular elements 74 and 76. These elements are detachably secured above and below the optical magnifier 64 with their longitudinal axes occurring in the same vertical plane in order that they may direct beams of light against the tubes 30 along the same angles of inclination. Tubes of varying intensity may replace those in use at any time.

To permit passage of light from these tubular members to the tubes, the casing 36 of the sighting apparatus includes a detachable panel section 36a which is constructed with inwardly extending sides, and these sides are formed with apertures 78 and 80 through which light may pass. Electrical conductors 82 and 84 are connected to the lighting tubes and, at their lower ends, are connected to a switch 86 shown in Fig. 1 of the drawings and which is, in turn, connected to a suitable source of power. It is pointed out that the lighting members 74 and 76 are substantially shielded by this form of casing and, hence, very little extraneous radiation reaches the tubes 30.

In place of fluorescent tubes producing ordinary white light, various other sources of electromagnetic radiation may be employed such as fluorescent tubes which generate long or short wave ultraviolet radiation, glow bar infrared sources, and radioactive materials used outside of or within the chromatographic tubes. I find also that it may be desirable to irradiate the chromatographic tubes with narrow waveband illumination because of variation in the radiation absorption and fluorescence characteristics of different materials.

Thus, some materials fluoresce hardly at all in wavelengths of 3650 Angstrom units but quite strongly in shorter wavelengths. Also, in the event that an attempt is made to measure invisible ultraviolet radiation generated through fluorescence caused by irradiation with another wavelength of ultraviolet light, it would obviously be desirable to carefully filter the irradiating source to remove the fluorescence generated wavelength since this would affect measurements by reason of its reflection from surfaces close to the fluorescing substance.

In accordance with the present invention, I may employ especially located glass filters to produce a relative narrow wave band of ultraviolet light, or other radiation, for special purposes. As shown in Figs. 2 and 3, I have located adjustably supported elongated filter elements 90 and 92 against the inclined portions of sides 36a directly in the path of rays of light passing from the lighting elements 74 and 76 to the tubes 30 so that the filter elements may substantially close the apertures 78 and 80 where this is desired. Also, it is chiefly intended to employ conventional type glass filters, but I may also desire to employ special types of filters, such as interference filters, and the like.

In connection with location of fluorescence zones, it is desirable to guard against extraneous visible radiation which can obscure the fluorescence phenomena. I have provided for this additional safety factor by introducing into the rear portion of the frame of the apparatus of the invention a light absorbent panel 94 having a light absorbent surface 94a which is preferably secured by being snapped into place in a suitably shaped opening in the casing body. This member 94 may have a light adsorptive surface or background comprised by a coating of carbon, or some other similar absorbing agent. By means of this device extraneous radiation may be almost entirely eliminated and a very accurate determination of fluorescent zone locations made.

I may also design the light absorbent member 94 with a second light reflective surface 94b. Such a surface may be comprised by a white coating, such as titanium dioxide, for example, or other suitable materials. The purpose of making available a light reflective surface is to provide for accentuation of certain types of observations which are made with the apparatus of the invention, and where a white background helps to form a contrast against which a miniscus may be more sharply defined. It should be understood that a white background which reflects incident light radiation is useful in providing contrast to facilitate readings where ordinary visible light chromatography is being carried out.

It is further pointed out that where ultraviolet light is being used to irradiate chromatographic tubes a radiation adsorbing background is useful in that it reduces reflection of the ultraviolet radiation toward the observer. This is especially important when relatively short wave length ultraviolet radiation is involved because this type radiation can cause "eye burn." Even relatively long wave length ultraviolet radiation, although it may not cause eye burn, does produce fluorescence effects in the eye which cause more or less shock to the observer. Also, where sensitive radiation measuring instruments are used it is essential to eliminate, so far as possible, extraneous radiation which could enter these instruments from the background in order to produce errors in measuring light flux.

In Figs. 5 and 6 I have illustrated a modification of the invention comprising a means for mounting in the frame described, a transversely movable radiation sensing instrument. Such an instrument has been indicated by the numeral 100 in Figs. 5 and 6 and may comprise, for example, a Geiger counter, a bolometer, an image converter, a photo-electric cell of either the magic eye tube type, or the electrical measuring type, or the recording type. Various other devices, such as Scintillation Meters and the like may be used.

In the structure shown in Figs. 5 and 6, I have indicated a casing structure 36' which is adapted to be secured to the casing section 36a illustrated in Fig. 2 of the drawings. When using the modification of Figs. 5 and 6, wing nuts 101 and 102 may be removed and the casing section 36, together with the partitions 60, 62 and supported elements 64 will then be removed from the apparatus. In place of these parts the new casing section 36' is installed and secured in place by the wing nuts 101 and 102. Mounted for movement transversely of the casing section 36' in a channel 103 is the measuring device 100, as shown, being supported on wheels 105 and 106 which are adapted to slidably engage in knurled surfaces of respective channel members 107 and 108 formed at two spaced-apart edges of the casing section, as shown in Fig. 6. Lighting tubes 74' and 76' are provided for directing light through the apertures in the casing section 36a. The measuring member 100 is preferably formed with a nozzle or tubular end 110 which extends inwardly for a short distance, as noted in Fig. 6.

With the arrangement described the radiation sensitive member 100 may be moved into any desired position with respect to any one of the tubes 30 to detect radiations emitted from material in the tubes and thus furnish a means of carrying out desired observations.

Fig. 7 is intended to represent diagrammatically a method of irradiating two absorbent layers $L_1$ and $L_2$ contained in a sample tube 120 and separated by an indexing interface $I_2$. Two sources of irradiation $S_1$ and $S_2$ are located above and below the plane of the interface $I_2$. These sources $S_1$ and $S_2$ are employed with predetermined intensity and spectral characteristics chosen with relation to known colors which are to be produced in layers $L_1$ and $L_2$ in a specific type of chromatographic analysis. The intensities of the sources $S_1$ and $S_2$ are definitely limited to values which will avoid displacement or distortion of the indexing interface $I_2$.

Fig. 8 is a diagrammatic view illustrating another method of the invention wherein absorbent layers $L_1$ and $L_2$ are to be formed while containing a fluorescent substance such as a fluorescent dye being contained in a tube 122 and being separated by an indexing interface $I_3$. Sources of radiation $S_3$ and $S_4$ are then employed of predetermined light intensity and spectral characteristics which will impart desired fluorescence without modifying or distorting the appearance of the indexing interface $I_3$.

Fig. 9 is intended to illustrate another modification of method of irradiating wherein adsorbent layers $L_5$ and $L_6$ are contained in a sample tube 124 and separated by an indexing interface $I_4$. In this modified form, two sources of irradiation $S_5$ and $S_6$ are employed. However, $S_5$ is chosen of intensity and spectral characteristics which are specifically related to the color which is induced in the layer 5. Similarly, source $S_6$ is chosen of different intensity and spectral characteristics directly related to the color and composition of the layer $L_6$. This method, as represented by Fig. 9, differs from those methods shown in Figs. 7 and 8 in that, while a limited degree of radiation is employed, there is, nevertheless, selectivity in accordance with light transmitting and spectral characteristics of the two layers as well as the interface itself.

Fig. 10 is illustrative of a method of irradiating adsorbent layers $L_7$ and $L_8$ contained in a sample tube 126 and separated by an indexing interface $I_5$. In this method, irradiation is carried out by two sources of ultraviolet light represented by the members $S_7$ and $S_8$. It will be understood that the layers $L_7$ and $L_8$ are provided in a form in which they contain fluorescent materials of specific nature capable of fluorescening when irradiated by certain narrow wavebands of ultraviolet light.

Fig. 11 is illustrative of a method of treating adsorbent layers $L_9$ and $L_{10}$ which contain a material capable of adsorbing ultraviolet light. These layers are contained in sample tube 128 separated by an indexing interface $I_6$. Sources of ultraviolet light are represented by the members $S_9$ and $S_{10}$. In Fig. 12, there is illustrated a method of irradiating two layers $L_{11}$ and $L_{12}$ by means of infrared radiations. Here, also, the layers are contained in a sample tube 130 and separated by an indexing interface I. The infrared sources are represented diagrammatically by the members $S_{11}$ and $S_{12}$.

Fig. 13 represents adsorbent layers $L_{13}$ and $L_{14}$ which are capable of absorbing radioactive waves contained in a sample tube 132 and separated by an indexing interface $I_8$. The two members $S_{13}$ and $S_{14}$ are intended to represent devices for emanating radio waves and similar electromagnetic radiations.

Fig. 14 is similar to Fig. 13 and represents diagrammatically layers $L_{15}$ and $L_{16}$ which contain radioactive traces. These layers are contained in a sample tube 134 and separated by indexing interface $I_9$. Members $S_{15}$ and $S_{16}$ represent devices for emanating radioactive radiations or other electromagnetic radiations.

From the foregoing description, it will be apparent that I have provided a novel and efficient apparatus for producing, observing, and measuring various radiation effects in connection with chromatographic analyses whereby desirable determinations may be carried out with respect to various types of fluids which may be desired to be examined. A great deal of flexibility and ease of adjustment is obtained with the relative arrangement of parts described and yet a high degree of accuracy may be realized for a wide range of detecting and measuring operations and the occurrence of error in carrying out these observations is reduced to a minimum.

While I have shown preferred embodiments of the invention, it should be understood and I may resort to modifications in keeping with the scope of the invention as defined by the appended claims.

This application is a continuation-in-part of my earlier application Ser. No. 228,845 filed May 29, 1951, for Apparatus for Chromatographic Analysis, now abandoned.

Having thus described my invention, what I claim is:

1. An apparatus for chromatographic analysis of fluid bodies comprising in combination a plurality of tubular members, means for supporting the tubular members in an upright spaced-apart position, said tubular members containing absorptive materials for use in receiving fluid bodies and producing chromatographic layers which merge to define indexing interfaces located at various levels in said tubes, vertically adjustable means for viewing the indexing interfaces, independent radiation source members movable with the vertically adjustable means for irradiating those portions of absorptive materials occurring above and below the indexing interfaces at any desired level of the interfaces in the tubular members, said radiation source members comprising a plurality of light sources arranged above and below the said viewing means and being adjustable to provide balanced light intensities in objective beams directed angularly against the said absorptive material portions occurring above and below the indexing interfaces, said light sources being variable to modify the spectral characteristics of the indexing interfaces as observed through the said viewing means.

2. An apparatus according to claim 1 in which the means for irradiating includes light sources located above and below the said indexing interfaces, said light sources being adjustable to vary the light intensity which may be directed against the said absorptive materials.

3. An apparatus according to claim 1 in which the means for irradiating includes light source members arranged above and below the plane of sighting of the viewing means, the light members being independently adjustable to produce varying degrees of light intensity.

4. An apparatus for chromatographic analysis of fluid bodies, a frame including a pair of spaced uprights, a plurality of tubular members vertically supported in the frame between said spaced uprights and in spaced-apart relationship, said tubular members containing an absorptive material for use in forming chromatographic layers when fluid materials are passed through the said tubes, a slide member extending between said uprights and lying in uniform spaced relation to each of said tubes, said slide member being vertically adjustably supported with respect to said uprights, means carried by the slide and coacting with said uprights for maintaining said slide normally in a horizontal plane, means engaging the end of the slide and supported by said uprights for maintaining the slide in horizontal position during its adjustment, an anti-parallax device including a lens having inner and outer horizontally extending lines lying in a common plane, said lens having a length extending fully across said spaced tubes, reflector members above and below said lens and extending the length of the lens, independent sources of irradiation positioned within the reflectors at points above and below the horizontally extending lines and extending lengthwise thereof for projecting converging beams of light which merge along the interface to illuminate said tubes, filter means angularly supported by said reflectors above and below said lens and intersecting the beams of light projected on said tubes, said converging beams cooperating to retard diffusion of radiation from the respective absorptive materials.

References Cited in the file of this patent

UNITED STATES PATENTS

| 1,375,708 | Klett | Apr. 26, 1921 |
| 1,729,106 | Hallwood | Sept. 24, 1929 |
| 2,056,693 | Stanley | Oct. 6, 1936 |
| 2,096,696 | Land | Oct. 19, 1937 |
| 2,377,056 | Tontrup | May 29, 1945 |
| 2,553,179 | Farr et al. | May 15, 1951 |
| 2,673,484 | Griffin et al. | Mar. 30, 1954 |

FOREIGN PATENTS

| 342,757 | Great Britain | Feb. 5, 1931 |

OTHER REFERENCES

"The Routine Chromatography of Fluorescent Pigments in Urine," Biochemical Journal (1942), vol. 36, pages XIX and XX, Coulson et al.

Chromatographic Absorption Analysis, by Strain, published by Interscience Publishers, Inc., New York, N.Y., in 1945, pages 72 and 73.